Figure 1:
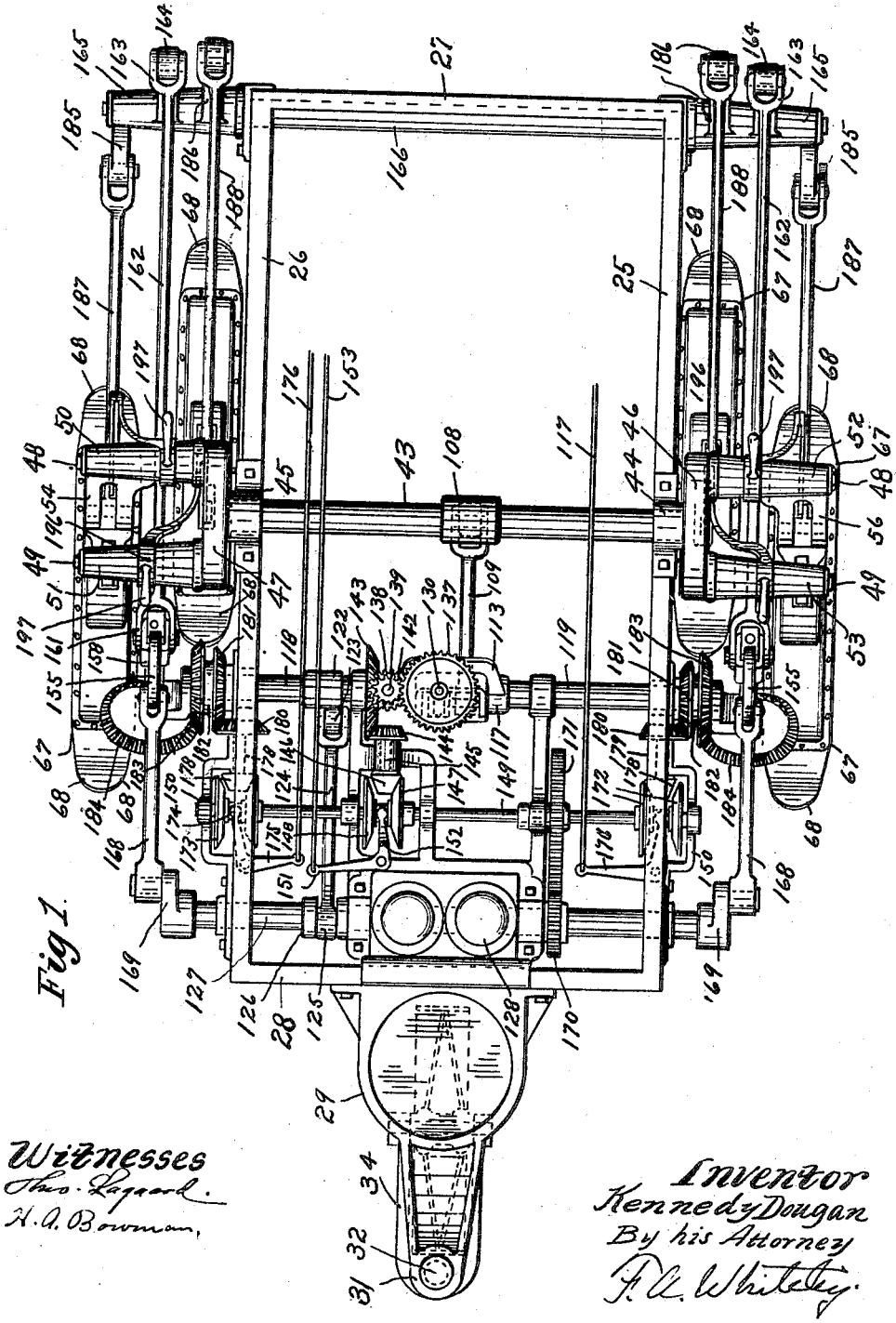

K. DOUGAN.
TRACTION ENGINE.
APPLICATION FILED FEB. 7, 1913.

1,234,145.

Patented July 24, 1917.
8 SHEETS—SHEET 1.

Witnesses
Thos. Lazzard.
H. A. Bowman.

Inventor
Kennedy Dougan
By his Attorney
F. A. Whiteley.

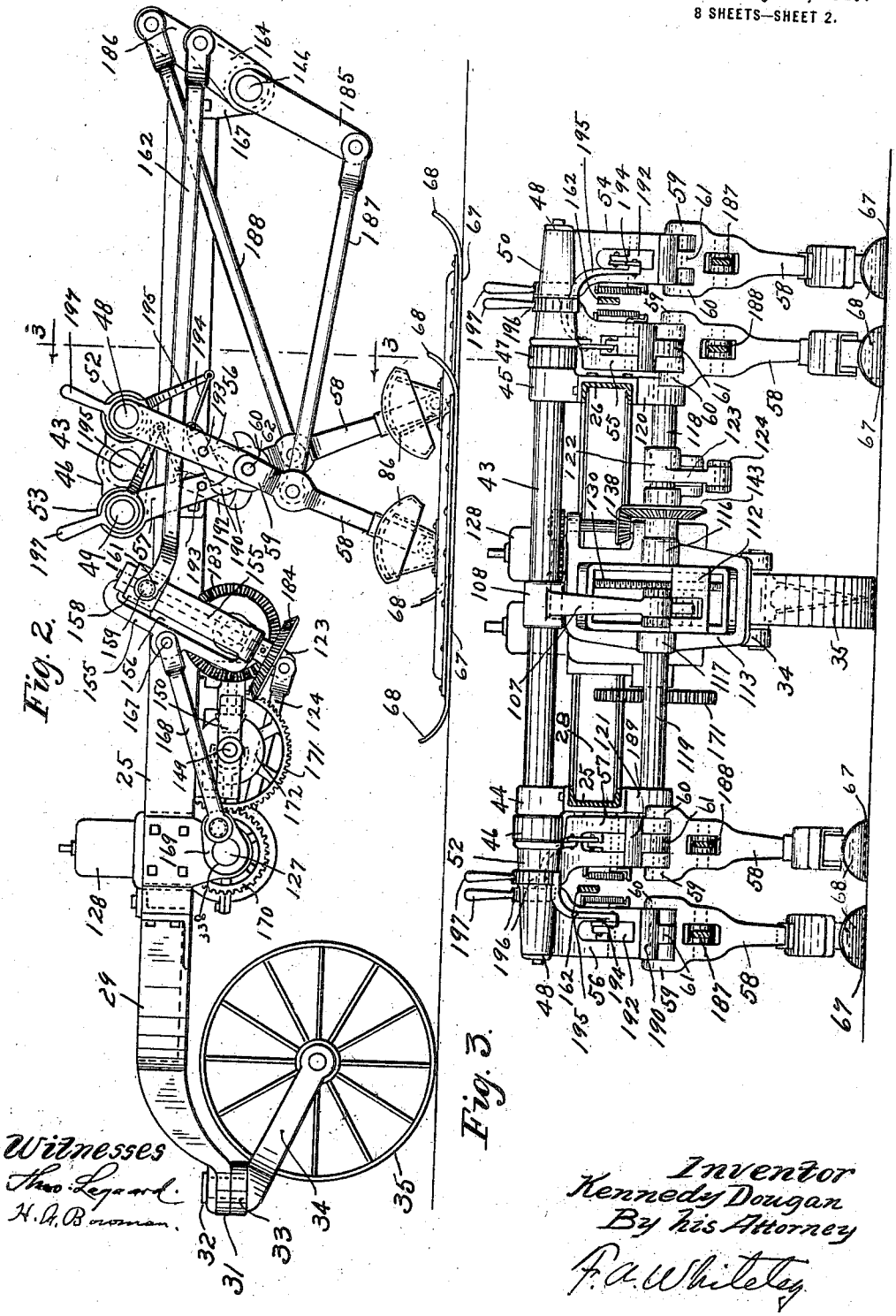

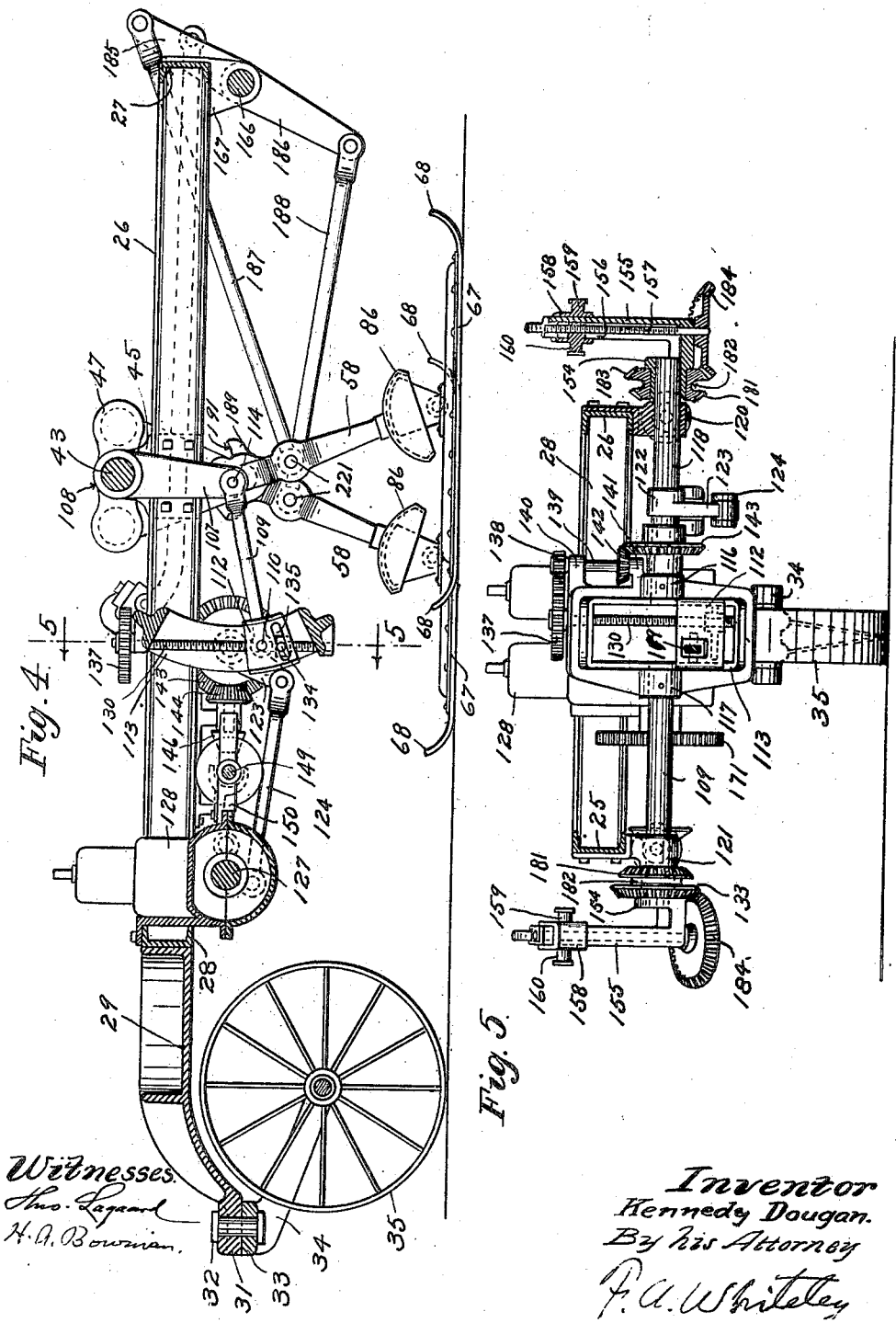

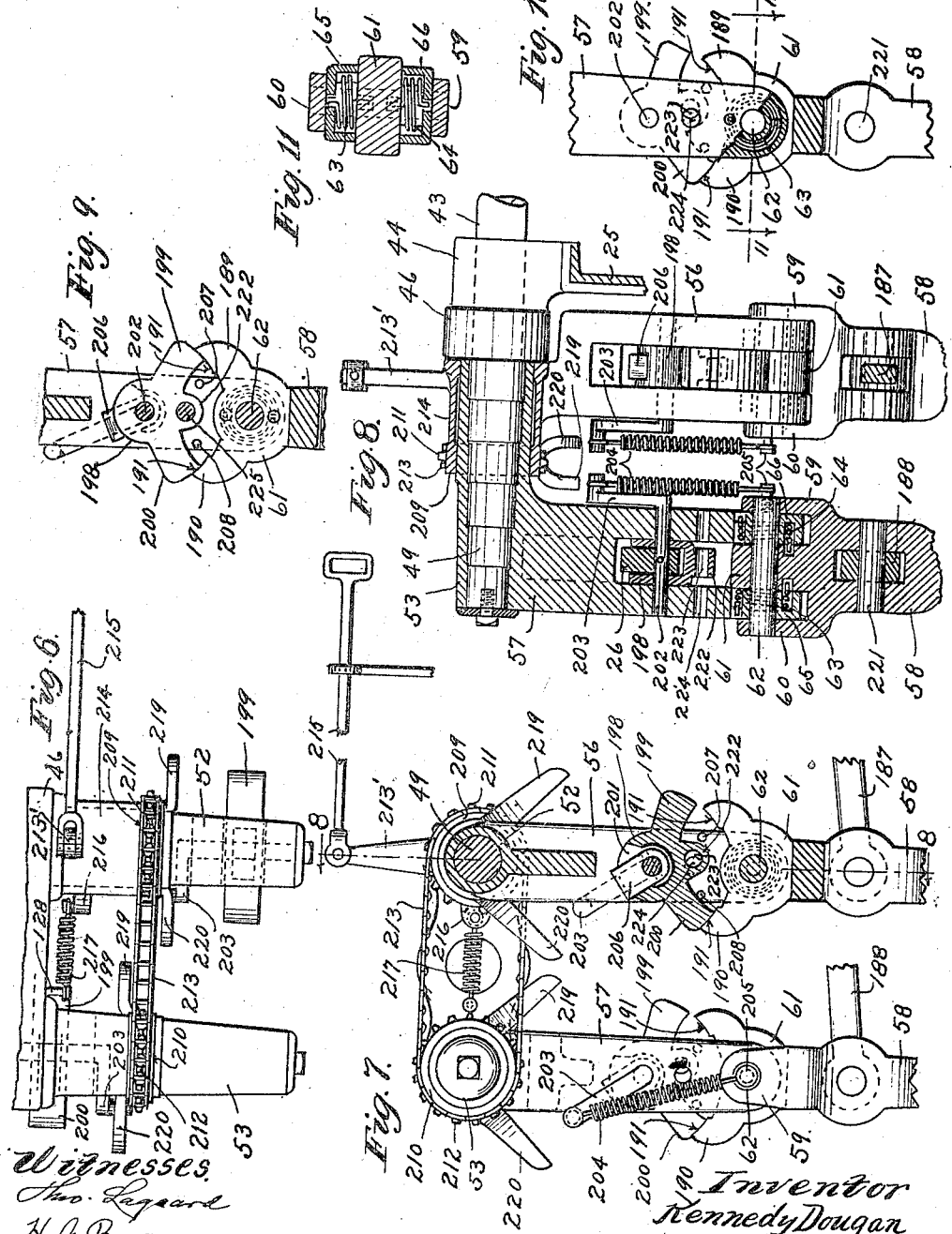

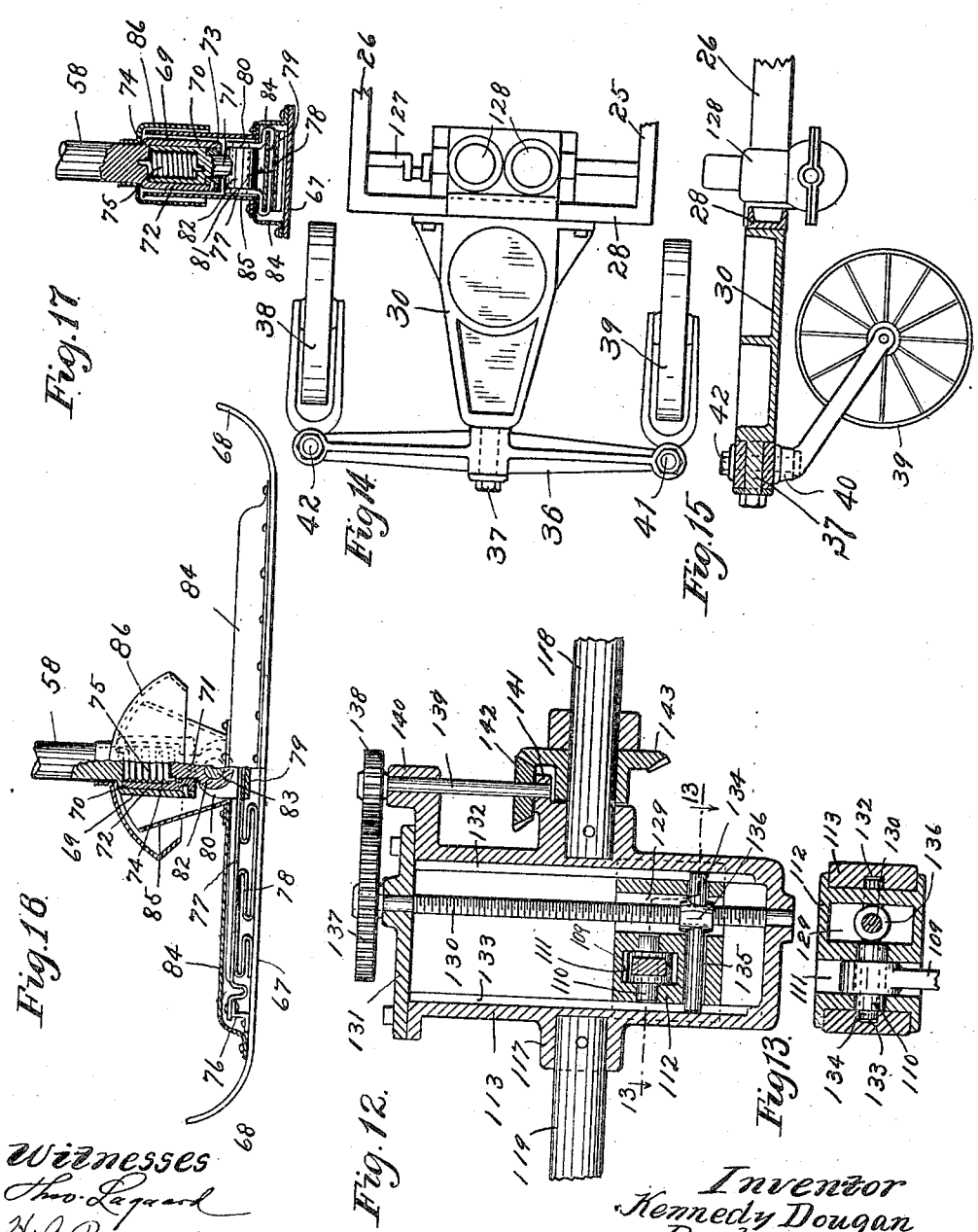

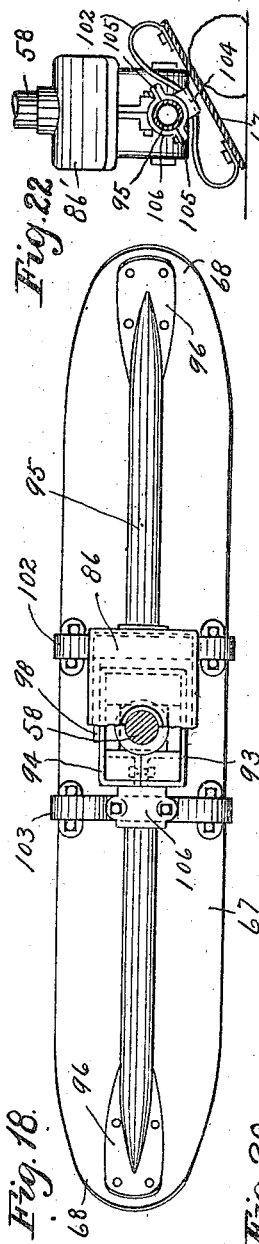
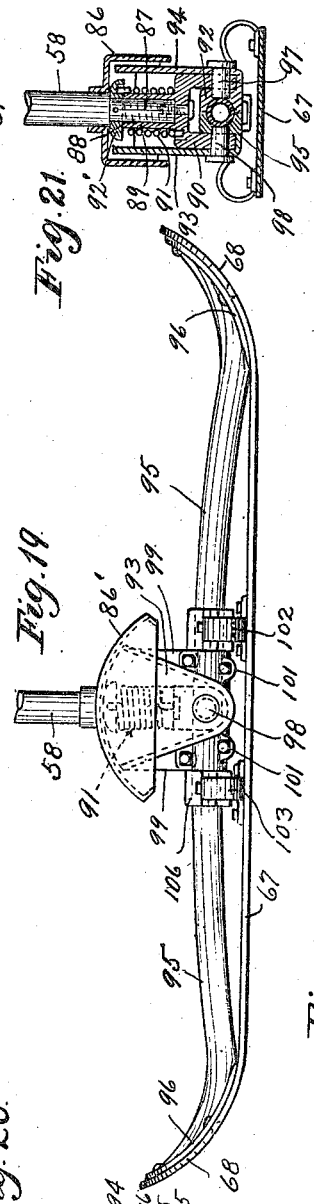
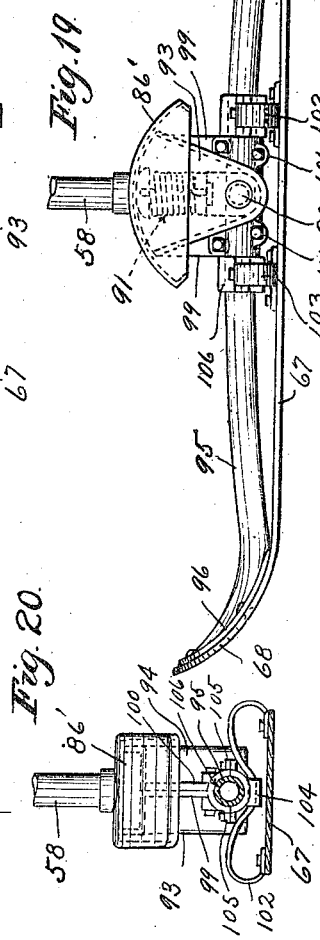
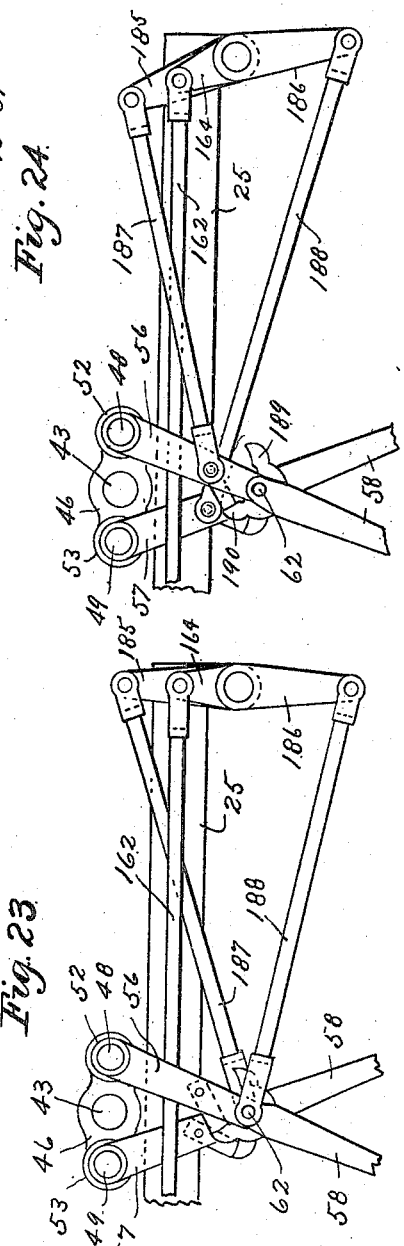

K. DOUGAN.
TRACTION ENGINE.
APPLICATION FILED FEB. 7, 1913.
1,234,145.
Patented July 24, 1917.
8 SHEETS—SHEET 7.
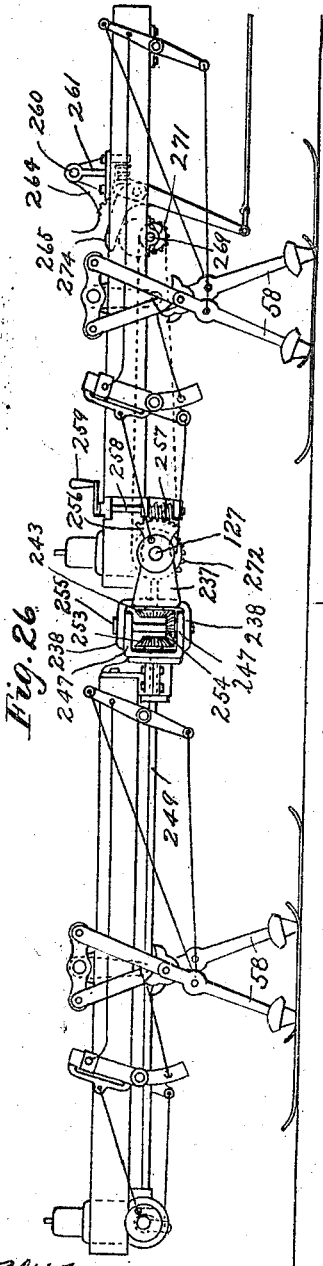
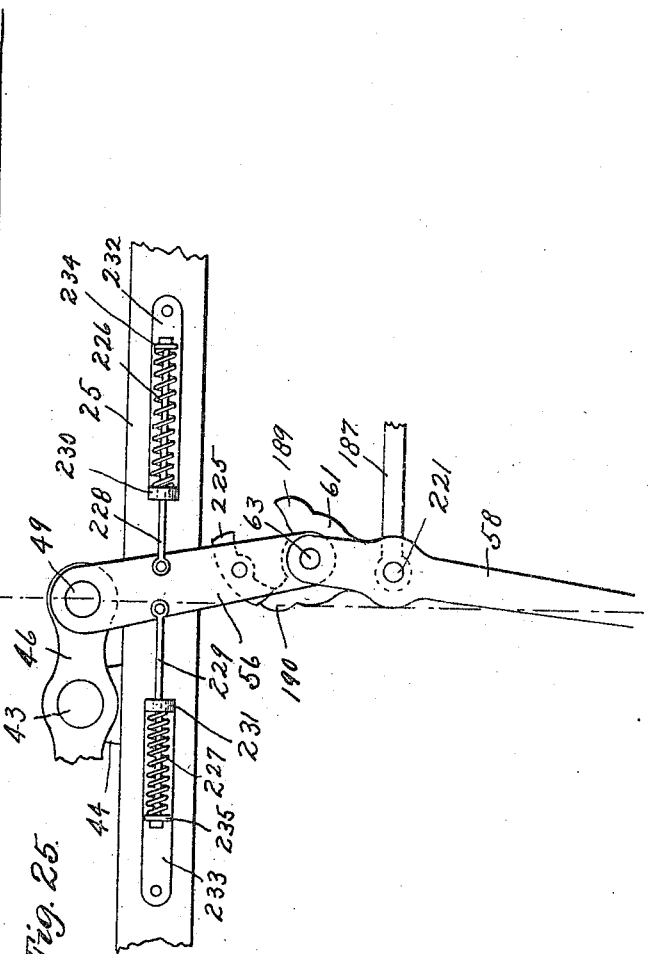
Witnesses
Inventor.
Kennedy Dougan
By his Attorney

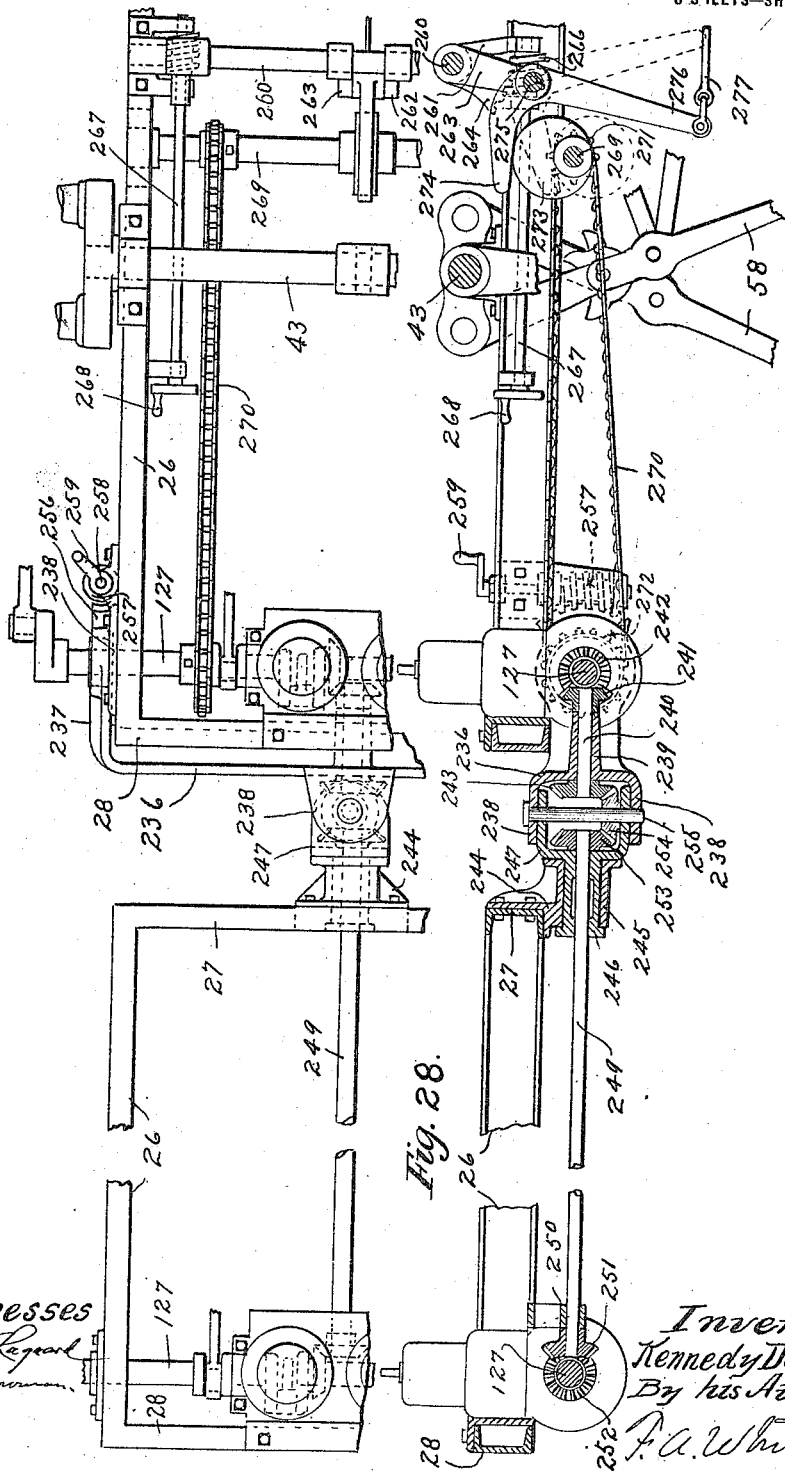

UNITED STATES PATENT OFFICE.

KENNEDY DOUGAN, OF MINNEAPOLIS, MINNESOTA.

TRACTION-ENGINE.

1,234,145.  Specification of Letters Patent.  Patented July 24, 1917.

Application filed February 7, 1913. Serial No. 746,753.

*To all whom it may concern:*

Be it known that I, KENNEDY DOUGAN, a citizen of the United States, residing at Minneapolis, in the county of Hennepin and State of Minnesota, have invented certain new and useful Improvements in Traction-Engines, of which the following is a specification.

My invention relates to traction engines and has for its object to provide a traction device in which the main load is carried on feet and legs that are caused to move in a manner much like those of a horse. Pairs of feet movable simultaneously at opposite sides of the machine are carried rearwardly relative to the machine body thereby moving it ahead over the ground and supporting the machine during such movement, while similar pairs of feet are being moved forwardly relative to the machine and supported thereby to the end of such forward stroke when they are brought into position to receive the load and in turn move relatively rearwardly and carry the machine forward.

It is a further object of my invention to provide a main frame or body to which the legs and feet are attached and upon which is mounted a motor and connecting means for imparting the required movement to the legs, to provide means for starting and stopping the tractor gradually and while the motor is in motion, means for regulating the rate of travel of the tractor over the ground from zero to the maximum speed, means for reversing the direction of travel of the tractor, means for steering the tractor in any direction desired by and through the aforesaid legs and feet, means for preventing undesirable shocks when the tractor is traveling over hard roads or obstructions, and means for adapting the tractor for use in special agricultural operations such as plowing or gathering corn.

It is a further object of my invention to provide means for giving a vertical movement to the legs in opposite directions at the end of each oscillatory movement in either direction and for regulating the amplitude of such vertical movement to correspond with the depth with which the feet sink in the ground, to provide knee mechanism to the legs so that a portion of the leg may oscillate independently in one direction only relative to the remainder of the leg, to provide means for reversing the break of the knee or direction of oscillation of said relatively movable portion of the leg and to provide means for reversing the order of vertical lifting movement, if desired, simultaneously with the reversing of the knee mechanism.

One of the chief advantages of my invention is that a very much higher percentage of the motor power is available at the draw-bar than is true of traction engines as now built. There are two reasons for this, first, because the entire mechanism of my engine will not need to be so heavy in order to secure the necessary tractive power from the fact that the feet by which the machine is propelled present a very large surface for a tractive grip upon the ground; and second, because there will be little waste of power from compressing the ground beneath the said large foot surfaces. In any form of rolling tractor such as traction wheel, endless chain and similar traction devices, there is great waste of power in compressing the ground beneath the traction members under ordinary conditions of soil. This is especially true in the cases where a tractor is used for plowing comparatively soft ground. In many cases the rolling contact traction members waste a major part of the energy of the machine in compressing the ground beneath the traction members. With my device there is relatively little compression effected by the traction feet. It is also true that power is wasted through such compression in inverse portion to the length of step taken by the tractor, since the longer the step the less the extent of ground surface subjected to compressing action.

A tractor built in accordance with my invention is adapted for propulsion by steam or gas engines or any other form of motor. It is adapted for drawing plows, harrows or wagons or for carrying guns or other war equipment anywhere that a horse may go and many places where a horse could not go. It is especially adapted for fording rivers where the depth of water and the current are considerable and also where the bottom may be too yielding to form an effective foothold for horses. It is especially adapted for use in sandy countries or on the great deserts and may advantageously be employed to supplant the camel in such regions.

The full objects and advantages of my invention will appear in connection with the detailed description thereof and are particularly pointed out in the claims.

In the drawings, illustrating the application of my invention in one form,—

Figure 1 is a plan view of a tractor embodying the devices of my invention. Fig. 2 is a side elevation thereof. Fig. 3 is a section on line 3—3 of Fig. 2. Fig. 4 is a longitudinal sectional elevation through the center of the machine. Fig. 5 is a transverse section on line 5—5 of Fig. 4. Fig. 6 is a plan view and Fig. 7 a side elevation partly in section of a modified form of knee shifting mechanism. Fig. 8 is a section on line 8—8 of Fig. 7. Figs. 9, 10 and 11 are detail views illustrating features of the knee-locking mechanism. Fig. 12 is a sectional elevation view showing the means of adjusting the extent and order of operation of the leg lifting mechanism. Fig. 13 is a section on line 13—13 of Fig. 12. Figs. 14 and 15, respectively, are a plan and sectional elevation of a modified form of front supporting wheels. Figs. 16 and 17 are two different views partly sectional of one form of foot. Figs. 18 to 22 illustrate features of another form of foot. Figs. 23 and 24 illustrate modifications of the manner of attaching the leg oscillating members. Fig. 25 shows a modified form of knee joint. Figs. 26, 27 and 28 are views partly fragmentary and diagrammatic showing means for coupling two tractors together and operating them as a unit.

The main frame of my invention comprises side members 25 and 26, a rear crossbar 27 and a front crossbar 28, which may consist of channel beams or other forms of frame members secured together and crossbraced in any desired way to provide a frame of the necessary strength and rigidity. To the front frame member 28 is bolted a forwardly projecting casting 29, as shown in Figs. 2 and 4, or a somewhat similar casting 30, as shown in Figs. 14 and 15. To a downwardly and forwardly projecting end 31 of the casting 29 is swiveled by means of a pin 32 the hub 33 of a fork 34 between the arms of which is journaled a wheel 35, the entire arrangement constituting a caster wheel support for the front end of the framework. In the forms shown in Figs. 14 and 15 the same results are obtained by means of a crossbar 36 swiveled to oscillate in a vertical plane upon a forwardly projecting pin 37 on the end of casting 30, a pair of caster wheels 38 and 39 having the hubs 40 thereof swiveled upon vertical pins 41 and 42. The form of front support shown in Figs. 14 and 15 is provided to be applied to the machine in cases when the same is adapted to be used as a cultivating device to run above a row of some crop such as corn, in which case wheels 38 and 39 would run on either side of the row.

At a point somewhat back of the middle of frame members 25 and 26 a powerful shaft 43 is journaled in bearing blocks 44 and 45 secured by means of horizontal and vertical flanges upon the tops of frame members 25 and 26, respectively, as best shown in Figs. 1 and 3. The ends of the shaft 43 extend beyond the outside limits of frame members 25 and 26, said ends having rigidly secured thereto heavy cross-heads 46 and 47, respectively, which cross-heads extend at right angles to the axis of the shaft 43 suitable and equal distances to each side thereof. Each of the heads 46 and 47 has integrally formed upon the respective ends thereof stub axles 48 and 49 upon which are journaled hubs 50, 51, 52 and 53 of upper leg sections 54, 55, 56 and 57. It will be noted, as best shown in Fig. 3, in reference to Figs. 1 and 2, that the right hand hubs 50 and 52 have the legs 54 and 56 extended from the outer extremities of said hubs, while the legs 55 and 57 upon the left hand hubs 51 and 53 are extended from the inner portion of said hubs, said legs thereby operating in parallel vertical planes and having their adjacent limits spaced one from the other. The purpose of this relative arrangement will be hereinafter given. The manner of forming the stub axles and hub sleeves with the attached upper leg sections is best shown in Fig. 8. The stub axles may if desired be simple cylinders but somewhat better results may be obtained with the employment of less metal when the stub axles are stepped, giving a series a cylindrical bearing surfaces successively of less diameter to the end of the stub axle, the interior of the hub being formed with correspondingly stepped cylindrical surfaces. As clearly indicated in Figs. 3 and 8, the lower ends of upper leg sections 54, 55, 56 and 57 are bifurcated. Secured to these bifurcated ends of the aforesaid upper leg sections are lower leg sections 58 each of which is identical in all respects for each leg member. The upper ends of the lower leg sections 58 are provided with side flanges 59 and 60 and a central flange 61, said central flange extending between the bifurcated ends of leg members 54, 55, 56 and 57 while the side flanges 59 and 60 come outside of the inner and outer sides, respectively, of said leg members. A pin 62 extends through the side flanges 59 and 60 and central flange 61 and the intervening portions of the bifurcated end of legs 54, 55, 56 and 57, respectively, thereby securing lower leg portions 58 to said upper leg portions so as to have a pivotal or swinging movement in the plane of said upper leg sections but at the same time be restrained from any transverse or twisting oscillation. Under certain conditions it may be desirable to provide means in the above described joint causing the lower leg sections normally and yieldingly to take a position in alinement with the upper leg sections. As shown in Figs. 8, 10 and 11, this may be effected by providing spiral springs 63 and 64 in pockets formed in the leg sections 65 and 66 between the outer flanges 59 and 60 and the center flange 61, respectively, each of said springs 63 and 64 engaging with one end the center flange 61 of the lower leg section and with the other end the aforesaid intervening portion 65 and 66 of the upper leg section. Movement of the lower leg section 58 upon pin 62 in one direction will operate to wind up spring 63 while movement in the opposite direction will wind up spring 64 and the balanced or neutral position will be such as to hold the lower leg sections 58 in alinement with the upper leg sections.

To each of the lower leg sections 58 is secured by means hereinafter described flat shoe-like feet 67. These feet may be of various forms and proportions but will primarily consist of an elongated wide plate-like member adapted to contact upon a considerable area of ground surface, and the major part of the weight of the machine is supported directly upon these feet 67 through the upper and lower leg sections above described and the shaft 43 to which the machine is attached by the bearing members 44 and 45 above described. The shoe plates 67 will have the ends turned up, as indicated at 68, to a desired extent to cause the same to ride over obstructions. While many different forms of feet may be employed it is essential that the means of attachment of feet 67 to lower leg sections 58 be a pivotal attachment to permit oscillation of said feet upon the leg members in the plane of movement of the legs and should be such as to distribute the downward thrust of the weight supported by the legs throughout the extent of the bearing or ground engaging surface of the feet. It is also desirable that the bearing portion of the feet shall have the same flexibility and resiliency and be capable of a smaller extent of rotation upon the lower end of leg sections 58. Different means of effecting such a connection are shown in Figs. 16 to 22, inclusive. As shown in Figs. 16 and 17, the lower end of the leg section 58 is provided with an expanded portion 69 within which is a cylindrical cavity 70. A shaft section 71 has an expanded cylindrical portion 72 fitting for close bearing contact within the cavity 70, said shaft section 71 being held in position within said cavity upon the expanded portion 69 by means of a washer 73 fixedly secured to the inner side of such expanded portion 69. The expanded portion 72 of shaft section 71 is provided with a cylindrical chamber 74 in which is a strong spiral spring 75 one end of which is secured in the shaft of leg section 58 while the other end is secured in the shaft section 71. The spring 75 is tightly coiled and normally holds the feet 67 in the plane of oscillatory movement of the legs but will yield sufficiently under strain to permit slight rotary oscillation of shaft section 71 and parts carried thereby in a relatively horizontal plane with respect to lower leg section 58. As shown in Figs. 16 and 17 the feet 67 have secured to upright projections 76 adjacent the ends of said feet a strong spring plate 77, said plate 77 being supported at intervals throughout its length by a corrugated spring member 78 engaging with one set of corrugations the plate 77 and with the other set of corrugations the foot proper 67. A transverse member 79 embraces spring members 77 and 78 at the central portion thereof, said member 79 comprising ears 80 and 81 between which is a bearing head 82 on the end of shaft section 71, said bearing head being pivotally connected to ears 80 and 81 by means of a pin 83. A casing 84 incloses the spring members 77 and 78, an upwardly opening and outwardly flaring casing section 85 secured to casing 84 around the ears 80 and 81 and adjacent parts connected thereto works within a downwardly opening casing 86 on lower leg section 58, said casings 85 and 86 comprising means for preventing dirt and extraneous substances from getting into the bearing formed on pin 83 and adjacent parts. It will be obvious that with the foot connecting mechanism above described the foot 67 will have a certain amount of resiliency both longitudinally and laterally so that if the same should ride upon an obstruction at one side thereof it could give sufficiently to prevent permanent deformation or breakage.

In Figs. 18 to 22 is illustrated a somewhat different form of connecting and thrust distributing mechanism for the feet 67. In this form the lower leg shaft 58 has a reduced cylindrical portion 87 which seats within a cylindrical aperture 88 in a shaft section 89. The shaft section 89 is provided with a head 90 and surrounding the reduced portion 87 is a spiral spring 91 having one end thereof secured to head 90 and the other end secured to a washer 92' fast on reduced portion 87. This arrangement operates in the same manner as the somewhat similar spiral spring connection 75 shown in Figs. 16 and 17, that is, holds the foot 67 normally in the plane of operation of the leg members but permits slight rotary movements of said foot upon the lower end of the leg. The head 90 is bifurcated, as clearly shown in Fig. 21 and straddles a block 92 preferably formed of two sections having casing walls 93 and 94, respectively, which extend along the end walls of the block 90. A tubular supporting member 95 is formed somewhat upwardly arched at the center and has the ends flattened out and secured to the upwardly curved end portions 68 of the foot 67, as indicated at 96. The supporting member 95 extends through a bearing formed in the block 92 and the block 92 is connected to the head 90 for oscillation in the plane of movement of foot 67 and leg 58 by means of pins 97 and 98. As best shown in Figs. 20 and 21, the casing members 93 and 94 are formed with end flanges 99 and 100, respectively, and bottom lugs 101 by means of which said sections are secured together about tubular shaft 95. Shaft 95 is therefore free to oscillate within said casing sections at right angles to pins 97 and 98 as well as to oscillate upon said pins 97 and 98. The foot 67 is additionally secured to the shaft 95 upon each side of the above described connecting mechanism by means of spring members 102 and 103, said springs being secured at their outer ends to the side portions of the foot 67 and carrying at their centers a block 104 which is clamped by means of flanges 105 and a cap piece 106 to tubular shaft 95. The arched tubular rod 95 will thus have considerable resiliency, which, together with the springs 102 and 103, gives a thrust upon the foot 67 which properly distributes the application of force and at the same time is sufficiently flexible and yielding to prevent breakage from abnormal shocks or strains. The cap piece or casing 86 carried by lower leg section 58 overlies the upwardly opening outwardly flaring cavity within casing members 93 and 94 for keeping out dust and dirt in the same manner as in the form shown in Figs. 16 and 17.

From the above indicated description of parts it will be apparent that when shaft 43 is rocked in one direction or the other stub axle 48 or stub axle 49 will be raised relative to the other and the feet connected with the said stub axles through the leg mechanism described will simultaneously be lowered and raised, one going up while the other is going down. A reversal of the rocking movement will, of course, produce the opposite result. As best shown in Figs. 3 and 4, I provide means for rocking the shaft 43 comprising an arm 107 having its hub 108 fast upon the central portion of shaft 43. The lower end of arm 107 is pivotally connected to a link 109 which link is secured by means of a pivot pin 110 within an aperture 111 in a block 112 mounted for sliding movement upon a frame casting 113 which may, if desired, be formed in the arc of a circle having its center at the point 114 of pivotal attachment of link 109 with arm 107. The frame casting 113 has rigidly secured thereto within expanded collar-like portions 116 and 117 the ends of shafts 118, 119, said shafts being spaced apart at their adjacent ends to permit clearance for the sliding movement of block 112, as clearly shown in Figs. 3, 5 and 12. The outer or free end of shaft 118 is journaled in a hanger 120 secured to frame member 26 while the free end of shaft 119 is journaled in a hanger 121 secured to frame member 25. The frame casting 113 is sufficiently strong and is so secured to shafts 118, 119 as to provide a perfectly rigid and powerful structure extending across the machine between hangers 120 and 121. Fixedly secured upon the shaft 118 is the hub 122 of a depending arm 123, said depending arm being pivotally connected to a pitman 124 which is pivotally connected at 125 to a crank 126 on the engine shaft 127 of a motor 128 mounted upon the frame of the machine. As the crank shaft is rotated by the motor the pitman 124 will communicate an oscillating movement to the member formed of the combined shafts 118, 119 and frame casting 113. This oscillating or rocking movement will be communicated through link 109 and arm 107 to shaft 43 unless the pin 110 by which link 109 is connected with block 112 occupies a position between and axially in alinement with the shafts 118, 119.

As before stated, the block 112 is slidably mounted upon the frame casting 113, and means are provided to hold the block properly positioned and adjust the same as desired upon the frame casting 113. This adjusting means is shown in detail in Figs. 12 and 13. The block 112 has adjacent the aperture 111 and running at right angles thereto a rectangular aperture 129 through which extends a threaded rod 130, said rod being journaled at its bottom in the frame casting 113 and at its top in a cap piece 131 secured upon said frame casting. The side members of the frame casting 113 are provided with grooves 132 and 133, and having its ends slidable within these grooves is mounted a pin 134 extending through an elongated aperture 135 in block 112, said pin having thereon a hub 136 within which the rod 130 is threaded. Upon the upper end of rod 130 which extends through cap 131 is a spur gear 137 meshing with a pinion 138 on the end of a shaft 139 journaled in bearings formed in brackets 140 and 141 outwardly extended from frame casing 113. Upon the lower end of the shaft 139 is a bevel gear 142 meshing with a bevel gear 143 loose on shaft 118. As best shown in Figs. 3 and 4, bevel gear 143 meshes with a bevel gear 144 on a short shaft held in a bearing 145 upon a portion of the frame, said short shaft having at its other end a bevel gear 146 adapted to mesh with either of two inwardly faced bevel gears 147 and 148 which are joined together and splined to a shaft 149 mounted in bearings carried by bracket frame devices 150 depending from side frame members 25 and 26. An elbow lever 151 has a clutch fork 152 by which the double bevel gears 147 and 148 may be shifted to neutral or engaging position with one or the other of said bevel gears 147 and 148, the operation of the aforesaid clutch shifter being effected through a connection 153 with a hand lever not shown. When gear 147 is caused to mesh with gear 146 the connecting gearing will rotate threaded rod 130 so as to cause the block 112 to move up the frame piece 113, while when gear 148 is clutched-in, rod 130 will be rotated in the opposite direction thereby causing block 112 to descend in frame piece 113. As already noted when the pin 110 is in alinement axially with shafts 118, 119, shaft 43 and the parts carried thereby will be stationary as the block 112 will oscillate equally about the said pin 110. When the block is brought above said axial center the shaft 43 will be oscillated in one direction and when said block is brought below the axial line of shafts 118, 119 the shaft 43 will be oscillated in the opposite direction. Furthermore, the extent of oscillation in each direction will be determined by the distance of block 112, or rather the pin 110 therein, from said axial center at one side or the other thereof. By the means described the extent of oscillation of shaft 43 and the stub axles 48 and 49 carried thereby may be varied from zero up to the maximum in either direction at will.

The shafts 118 and 119 extend outside of brackets 120 and 121 and upon such extended portions are revolubly mounted sleeves 154, each of said sleeves carrying a bracket post 155. The bracket posts 155 have a slot 156 in which is revolubly mounted a threaded rod 157, as best shown in Fig. 5. A block 158 provided with connecting studs 159, 160 is slidably mounted upon each of the bracket posts 155, said block having a portion extending within the slot 156 through which the rod 157 is threaded. To the studs 159 and 160 is secured the yoke end 161 of a connecting rod 162 which connecting rod has its other yoked end 163 pivotally connected with an arm 164 fast on a hub or sleeve 165 rotatable upon the extended end of a shaft 166 which is fixedly mounted in brackets 167 depending from the rear end of frame members 25 and 26. The posts 155 are pivotally connected with pitmen 168 by pivots 167, said pitmen 168 being driven by cranks 169 rigidly secured to shaft 127. Rotation, therefore, of the crank shaft will oscillate the posts 155 which through connecting links 162 will simultaneously oscillate the sleeves 165 at the rear of the machine. Upon the crank shaft 127 is a pinion 170 meshing with a spur gear 171 on the shaft 149 by which shaft 149 is constantly driven at the desired speed. It is noted that the parts above described, with the exception of the drive gearing 170, 171, are duplicated on the two sides of the machine, the shaft 166 extending outside of frame members 25 and 26 at both sides of the machine and supporting for oscillation upon each of said extended ends a hub or sleeve 165.

The shaft 149 has splined to each end thereof a pair of inwardly faced bevel gears 172, 173 connected to move in unison. The gears 173 at one side of the machine are controlled by a clutch fork 174 which in turn is connected to an arm 175 controlled by a link or flexible connection 176′ extending to a hand lever, not shown. Similarly the pair of bevel gears 172 at the opposite side of the machine are connected to move in unison and are controlled by a clutch fork having an arm 376 which in turn is connected by a link 177 with another hand-operative lever, not shown. Each of the pair of bevel faced gears 172 and 173 have the faces thereof positioned on either side of a bevel pinion 178 on a short shaft 179 journaled in a part of the framework, as indicated in dotted lines in Fig. 1. The respective faces of said double gears 172 and 173 are supported so that neither of said faces or either thereof, as desired, may be brought into engagement with the bevel pinion 178. Upon the other end of shaft 179 is a bevel gear 180 meshing with a bevel gear 181 on a sleeve 182 mounted to rotate upon the sleeve 154 on the ends of shaft 118, as best shown in Figs. 1 and 5. The sleeve 182 has thereon a bevel gear 183 meshing with a bevel gear 184 fast on threaded shaft 157. It will be apparent from the above that by means of the respective clutch shifters 175 and 376 the pairs of bevel gears 173 and 172 may be connected to operate the connections by which the threaded shafts 157 at each side of the machine may be rotated in either direction either simultaneously or one at a time at the will of the operator. By this means the extent of oscillation of the sleeves 165 at opposite sides of the machine may be made of different lengths which will correspondingly differentiate the length of steps being taken by feet 67 at opposite sides of the machine, as will be hereinafter described, causing one side of the machine to move more rapidly than the other which will have the effect of turning the machine around. During turning movement the caster arrangement of single wheel 35 or double wheels 38 and 39 will operate so as to facilitate said turning movement and in nowise hinder the same. Upon each of the sleeves 165 is a pair of oppositely disposed arms 185, 186, said arms being relatively positioned the same at each side of the machine, the arms 185 being positioned so as to extend outwardly from the outer ends of sleeve 165 while the arms 186 extend in diametrically opposite direction from adjacent the inner ends of sleeve 165. Pivotally with arms 185 and also with the outer leg members 58, as will be more fully described hereinafter, are driver shafts 187. Similarly connected with arms 186 and inner leg members 58 are driver shafts 188.

As has been generally pointed out above, the leg members 58 of each pair thereof at each side of the machine are reciprocated in alternation past one another and the points of support of said leg members are reciprocated in a vertical direction at the ends of each reciprocation in a given direction, at one end lifting the support and at the other lowering it, thereby lifting and lowering the leg itself bodily. The leg which is lifted will, of course, have completed its active stroke and the leg which is lowered will then begin its active stroke. In the case in which the machine is being propelled in a forward direction the active stroke of the leg and feet thereon will be in a direction relative to the rear of the machine, while at the same time the other legs will be reciprocated in a direction relatively toward the front of the machine. Although it would be practicable in the practice of my invention to change the elevation of the points of support of the respective legs of each pair a sufficient amount to provide ground clearance for the leg which is traveling inactive, in many instances this would result in too much vertical oscillation of the frame of the machine itself, for which reason I have provided the jointed leg structure above described. With such a jointed structure it is however necessary that means shall be provided for holding the parts of the leg rigid and in alinement while the same is making its active stroke although said parts should break at the knee joint so as to permit relative shortening of the leg and ground clearance for the foot thereon during the inactive or return stroke; and such means must also be capable of operation so as to reverse the direction of break of the joints when the direction of travel of the machine is reversed. To effect this result I provide upon the central flange 61 of the head on lower leg sections 58 a pair of wings 189, 190, said wings having an upwardly faced arc-shaped bearing portion 191. As shown in Figs. 2 and 3, keys 192 are pivotally mounted on pins 193 extending through the upper leg members 57, said keys being positioned in the slotted portion between the bifurcated ends of said upper leg sections. Pivotally connected to the upper end of each of keys 192 above the pins 193 by means of links 194 are arms 195 attached to sleeve hubs 196 rotatably mounted upon the outside of hub sleeves 50, 51, 52 and 53. The sleeves 196 have attached thereto handles 197 by means of which said sleeves are oscillated upon the hub sleeves 50, 51, 52 and 53, the oscillation of any sleeve acting through its connected arm 195 and link 194 to oscillate key 192 so as to throw it from engaging position with one wing as 190 into engaging position with the other wing 189. As shown in Fig. 2, in which the keys 192 are held in engagement with wings 190, when the legs are drawn rearwardly by the drive rods 187 or 188, the engagement of key 192 with wing 190 will prevent said knee breaking joint in the direction in which the leg is being pulled. When, however, the leg is moved in the opposite direction it will be free at the joint and the lower leg section may swing back to the extent required to give ground clearance. When it is desired to reverse the operation of the machine the keys may by the means described be thrown into engagement with wings 189 and the legs locked from breakage in the opposite direction.

Figs. 6 to 10, inclusive, show a modified form of knee locking structure which may be preferred to that above described. In this form there is pivoted between the portions of each of the upper leg sections 54, 55, 56 and 57 a key 198 having thereon two wings 199 and 200. Wing 199 is adapted to coöperate with the wing 189 of flange 61 while wing 200 similarly coöperates with wing 190 of flange 61. The two wings 199 and 200 are so related to the members 189 and 190 that either wing 200 will engage wing 190 or wing 199 will engage wing 189 or if the member 198 is centrally positioned both wings 199 and 200 will be respectively in engagement with wings 189 and 190, as shown in Fig. 9. The three positions of the key 198 therefore permit breaking of the knee joint in one or the other of its two opposite directions or hold the sections of the leg rigidly in alinement so as to prevent all pivotal movement at the joint. As best shown in Fig. 7, the key 198 is provided with an upwardly flaring aperture 201 through which extends the pin 202 by which the key member is pivotally held in position. The pin 202 extends outwardly at one side of leg member 56, being formed with a crank arm 203 to which is secured a spring 204, the other end of said spring being secured to a stud 205 extended outwardly from the end of the pivot bolt 82. Fast on the pin 202 within the aperture 201 is a block 206 which is capable of an oscillating movement with pin 202 relative to key 198 and limited in extent by the end walls of the cavity 201, the spring 204 operating to hold said block 206 in engagement with one or the other of said walls according to which side of the axial center of pin 202 the said spring may be positioned.

The spring will thus tend to rock the arm 203 in one direction or the other and with it the key 198 so that either wing 199 or wing 200 will be brought into engagement with wing 189 or wing 190, pins 207 and 208 on upper leg members operating to limit movement of the wing in either direction beyond a fixed point. To reverse the locking action of a key it will only be necessary to swing the arm 203 so that block 206 will pass from engagement with one wall into engagement with the other wall of aperture 201, and the spring 204 will effect the further movement of the parts resulting in the shifting of key 198 to bring the opposite set of wings on said key and the flange 61, respectively, into engagement. This arrangement is desirable because the shifting might be begun when a considerable degree of pressure was being exerted by the face 191 by either wing 199 or wing 200, and until such pressure were released it might be difficult or impossible to shift the key 198. By throwing the spring over in the manner above described, the moment that the pressure on face 191 is released and before the other wing of flange 61 can be moved to bring this face 191 out of alinement with the face of the wing of the key 198 to be brought into coöperation therewith the spring 204 will shift said key and wing and effect such coöperation. To swing the arms 203 in either direction as desired I provide ring members 209 and 210 on the respective pairs of hubs 50, 51, and 52, 53. Ring member 209 is provided with a sprocket wheel 211 and ring member 210 with a sprocket wheel 212, and by means of a sprocket chain 213 said ring members are operated in unison, an arm 213′ on an extended sleeve-like portion 214 of ring member 209 being pivotally connected to an operating handle 215, by means of which the ring members 209 and 210 are simultaneously rotated in either direction, as desired. Upon the sleeve portion 214 is an extension or lug 216, and a spring 217 is connected therewith and to a stud 128 on the bearing head, this spring operating to hold the ring members 209 and 210 in the desired normal position and to return them to such position after the same have been actuated. Upon each of the ring members above described are a pair of outwardly extended arms 219 and 220. Upon rotation of the ring members in one direction the arms 219 will be brought into engagement with the ends of crank arms 203 on the respective pairs of leg members 54, 55, or 56, 57, operating to swing said crank arms so as to bring the springs 204 connected therewith to the other side of the axial center of pins 202 with the result that said springs are set to swing the keys 198 so as to reverse the engagement of the wing members thereon and reverse the direction of break of the knee joints. The key members 198 are provided with a projection 222 positioned centrally between wing members 199 and 200, in which is a bolt hole 223. The portions of the leg members 56, 57 are provided with similarly disposed bolt holes 224 alining with bolt hole 223 when key 198 is positioned as indicated in Fig. 9 so that wings 199 and 200 engage the wings 189 and 190 on flange member 61. When it is desired to hold the leg sections as a rigid member a bolt 225, as indicated in Fig. 9, is extended through the apertures 223 and 224 by which means the key member 198 is held in position to lock the two sections of the leg against pivotal movement in either direction.

The drive rods 187 and 188 may be variously connected to the leg members. As shown in Figs. 2 and 4, these rods extend within sockets formed in the lower leg members 58 where said drive rods are pivotally connected to the leg members by means of bolts or pins 221, and in practice this will be found a very desirable connection since the active pull of the drive rod will thereby get a fulcrum purchase such as to hold the parts of the joint-locking device, whichever form is employed, in constant engagement and the joints rigidly locked to hold the leg members in alinement during active stroke. Other forms of connection are shown in Figs. 23 and 24, in Fig. 23 the connection of the drive rods being made at the joint while in Fig. 24 the connection is shown as made above the joint.

The operation of my machine has been very fully given in connection with the description of the detail parts thereof. In general, supposing the parts to be as indicated in Figs. 2 and 4 and the engine in operation, it will be noted that crank shaft 127 has, through connecting rods 168, rocked the members 155 to the limit of their outward position and thereby, through connecting rods 162, have rocked arms 186 and 185, and, through drive rods 187 and 188, have advanced one of each pair of leg members on each side of the machine to extreme forward position, the other having been carried to extreme rearward position. The connecting rod 124 in the meantime has rocked shaft 118 and with it casting 113 which, through connecting rod 109, is rocking shaft 43 thereby lowering the hubs 50 and 52 for the advanced legs at each side of the machine and raising the hubs 51 and 53 of the legs which have been carried to the rear. As the cranks 169 connected with pitmen 168 are passing dead center, at which time the smallest movement of members 155 is effected, the pitman 124 is operative to effect the largest oscillatory movement of shaft 118 and casting 113 with the result that the change of elevation of pairs of hubs 50 and 52, and 51 and 53, respectively, takes place prinicpally at the ends of longitudinal reciprocation of the leg members and the feet 67 carried thereby. Continued rotation of crank shaft 127 swings the members 155 in the opposite direction thereby rocking the arms 186 and 185 and through drivers 187 effecting the relatively rearward and active stroke of the outside pairs of legs, the point of pivotal supports 50 and 52 of which have been lowered, while the drive shafts 188 correspondingly move in a forward or inactive direction the other pair of legs whose supports 51 and 53 have been elevated. The feet 67 of the active pair with lowered supports contact with the ground and support the weight of the frame, and the pull of the drive shaft 187 draws and holds the wings 190 in the locking engagement with the keys 192 or the keys 198, whichever form is used, so that said active legs operate as a rigid member from their point of support to the point of fulcrum on the feet and the machine is thereby forced ahead over the ground to the extent of the step or length of oscillation relative thereto of the feet 67 connected with said active legs. Meantime the drive shafts 188 are pushing the other pair of legs having their supports 51 and 53 elevated in a forward direction relative to the machine. The points of support are so elevated that for a considerable portion of the stroke the feet on said legs will have ground clearance independent of any breaking of the knee joint, which, however, being free to break ahead when the leg member is moved in the relatively forward direction will, upon contact of the feet with the ground, break so as to permit the lower leg sections to oscillate to the extent required to permit the inactive leg members to be forwarded to active position. The springs 63 and 64 will operate to swing the lower leg sections into substantial alinement before the lowering of the point of support thereof brings the feet on said forward leg section into contact with the ground. The operation will thereafter be repeated, and so on continuously, each pair of legs and feet alternately having an active or ground engaging and inactive or ground clearing stroke, the ground engaging stroke operating to propel the machine in a forward direction, or if it is desired to reverse the machine the block 112 will be shifted to the opposite side of the axial center of shafts 118, 119, reversing the direction of oscillation of shaft 43, and at the same time the keys 192 or 198 will be shifted so as to break joints in the opposite direction, whereupon the order of active and inactive strokes of the pairs of feet and legs will be reversed and the machine propelled backward. If it is desired to turn the machine around the length of stroke of the legs and feet on the inside of the curve to be turned will be shortened by means of shifting block 158 at that side, which, of course, will result in moving one side of the machine more rapidly than the other and consequent turning of the machine.

In Fig. 25 is shown a modified form of leg or knee joint or perhaps more properly stated a somewhat different type of locking key in relation to the said knee mechanism. As shown in this figure, a key 225 is employed of such a length that when an end of the same engages wing 189 or wing 190 the upper leg section 56 and the lower leg section 58 will not be held in alinement but will be bent at the joint in a direction away from the engaging wing and knee. In the form shown in Fig. 25 I also use for swinging upper leg section 56 in relation to lower leg section 58 springs 226 and 227 surrounding rods 228 and 229 pivotally connected to leg member 56 and passing through apertures in lugs 230 and 231 on straps 232 and 233 bolted to frame members 25, the springs engaging between the respective lugs 230 and 231 and collars 234 and 235 on the ends of rods 228 and 229, respectively. When the leg members are oscillated in either direction one or the other of the springs 226 or 227 will be compressed, which will operate to swing the leg member 56 so as to cause prompt engagement between key 225 and wing 189 or wing 190.

In Figs. 26 to 28, inclusive, is shown a means of coupling two tractors together so as to dispense with the front wheels and obtain traction from the entire weight of both tractors. The desirability of so coupling arises from the fact that it may happen that a farmer will own two of these tractors. For cultivating or light hauling and light work generally he will operate the tractors separately. But in cases where he wishes to do heavy hauling or heavy plowing he may couple the sets of tractors together so as to operate the two tractors as a unit and thereby double the power. The coupling is shown in detail in Figs. 27 and 28 in which a heavy yoke member 236 has the ends 237 thereof turned so as to come outside of side frame members 25 and 26 and being pivoted upon a bearing formed on hangers 338 depending from the side frame members and through the center of which bearings the crank shaft 127 extends. The yoke member 236 is provided with a pair of horizontal ears 238 forwardly extending from the rearwardly extended tubular bearing 239, a shaft 240 extending through said tubular bearing and having a bevel gear 241 on its inner end meshing with its bevel gear 242 on the crank shaft 127 and another bevel gear 243 at its other end between the ears 238. The parts of the coupling above described are limited to one of the traction engines and take the place of the front wheels of said engine.

Upon the other traction engine and correspondingly taking the place of the front wheels thereon is a casting 244 bolted to cross piece 27 and provided with a horizontal tubular bearing portion 245 extending below the lower portion of said crossbar 27. Within the bearing 245 and having freedom for swiveling or rotary movement in a horizontal plane is a connector piece 246 provided with ears 247 which lie within the ears 238 above referred to. An extended shaft 249 has a bearing at one end within the connector member 246 and at the other end is suspended in a bearing in a hanger 250. Upon the shaft 249 is a bevel gear 251 meshing with the bevel gear 252 on the crank shaft 127 of the engine, and upon the other end of the shaft 249 is a bevel gear 253 positioned between the ears 247. Each set of ears 247 and 238 is provided with vertically alined apertures, and when the ears 247 are brought within ears 238 so as to bring the respective sets of apertures into alinement the bevel gears 243 and 253 will be spaced apart the proper distance for meshing with a bevel gear 254 held in position by a connecting pin 255 which passes through said sets of apertures and said last named bevel gear. With this connection it will be seen that the two traction engines are coupled together with perfect freedom of relative movement in both vertical and horizontal planes while the crank shafts are geared to move in unison. As best shown in Figs. 26 and 28, the rearwardly extended portions 237 of the yoke members 236 are provided with worm segments 256 which segments mesh with worms 257 on vertical shafts 258 operated by hand cranks 259. By this means the yoke member 236 may be rocked upon crank shaft 127 and the forward traction engine lifted or lowered relative to the rear traction engine which is of advantage when going over uneven ground, particularly where there are sharp variations such as may be found upon the crests of hills, railroad crossings, etc.

As shown in Figs. 26 to 28, I may employ an equalizing device whereby the motion of the vehicle being drawn by my engine will be kept approximately constant. In a stepping machine such as that herein shown, except for the momentum of the machine and the parts drawn thereby, a complete stop is likely to occur between steps. I provide a transverse shaft 260 to the rear of shaft 43 which may preferably be supported in brackets 261. The shaft 260 has fast thereon, adjacent its middle portion, a pair of hangers 262 and 263, and at each of its ends a segment arm 264 provided with a worm segment 265 which meshes with a worm 266 on a horizontal shaft 267 adapted to be operated by a hand wheel 268. By means of this hand wheel and worm the position of arms 262 and 263 may be changed relative to the end of the machine.

Journaled in bearings in frame members 25 and 26 is another transverse shaft 269 adapted to be constantly driven by a sprocket chain 270 which runs over a sprocket wheel 271 on the shaft 269 and a sprocket wheel 272 on the crank shaft 127. The shaft 269 has thereon an eccentric or cam member 273 which engages a cam arm 274 pivotally mounted on a shaft 275 carried by the hangers 262 and 263, the arm 274 extending in a forward direction so as to overlie the cam 273. The part 274 comprises one arm of an elbow or crank lever which is continued past the shaft 275 in a depending arm 276 to the lower end of which is connected a link 277 attached to the vehicle, plows or other apparatus to be drawn. The eccentric or cam member 273 is so arranged with reference to the arm 274 and with the mechanism for making the step that it will be actuating the arm 274 and the connected arm 276 to draw the lower end of the arm 276 and the parts attached thereto in a forward direction at the time of the change of step, thus compensating for the checking of movement of the engine in respect to the apparatus drawn thereby.

It is to be noted that the shaft 249 may if desired be made sectional and be provided with a resilient compensating device of common construction to take car of variations in the operation of the different engine units. The connecting drive consisting of shaft 249 and the bevel gear connections within ears 247 may if desired be entirely dispensed with, each engine operating entirely independent. In this case it may be desirable to provide yielding compensating mechanism of known construction, such as a heavy spiral spring connecting two parts of the crank shaft and normally holding the same to rotate in unison, but permitting a certain amount of variation between the drives of the different engine units.

When such compensating members are employed the different engine units may operate at a different rate of speed, that is, engine unit number 1 might be making one hundred steps per minute and engine unit number 2 one hundred fifty, more or less, steps per minute. The steps of engine unit number 1 would be made at a length equal to the full stroke for which the driving devices of unit number 1 were set at that time, while the steps of engine unit number 2 would be less than such full stroke length through operation of the compensating devices, so that the actual ground covered by the steppers of both engines would be the same.

Inasmuch as the traction engine proper will have a slightly irregular movement coming practically to a stop between each set of steps, it might be that an operator sitting upon the machine would be caused discomfort thereby. It would be practicable and is contemplated by me to provide a slidable platform upon the frame of the machine connected with the lower end of the arm 276 so that the same would partake of the same movements as this arm. This would result in a practically uniform forward movement of the seat of the operator and would avoid the aforesaid inconvenient effects of a jerky forward movement.

I claim:

1. A tractor comprising a frame and a plurality of legs having feet thereon for supporting the frame, means for reciprocating said legs and thereby propelling the tractor, means for lifting said legs bodily at the end of the stroke in one direction and for lowering the legs bodily at the end of the stroke in the opposite direction, and means for stopping the lifting motion independently of the reciprocating motion.

2. A tractor comprising a framework and a plurality of legs having feet thereon for supporting the tractor, said legs being arranged in pairs at each side of the machine, means for reciprocating the legs of each pair and thereby propelling the tractor, and means for changing the length of the stroke of the legs for varying the speed of the tractor.

3. A tractor comprising a framework and a plurality of legs having feet thereon for supporting the tractor, said legs being arranged in pairs at each side of the machine, means for reciprocating the legs of each pair and thereby propelling the tractor, and means for continuously varying the length of the stroke of the legs for starting or stopping the tractor.

4. A tractor comprising a framework and a plurality of legs having feet thereon for supporting the same, means for reciprocating said legs and thereby propelling the tractor, said legs being provided with joints permitting the legs to bend in the direction of reciprocation, means for restraining said legs from bending in one direction, and means under the control of the operator for causing the restraining means to lock the joints of the legs and cause the legs to become rigid.

5. A tractor comprising a framework and a plurality of legs having feet thereon for supporting the same, means for reciprocating said legs in alternation and thereby propelling the tractor, and means for independently varying the amplitude or length of reciprocation of said legs.

6. A tractor comprising a framework and a plurality of legs having feet thereon for supporting the tractor, a portion of said legs being arranged at each side of the machine, means for reciprocating legs on each side of the machine and thereby propelling the tractor, and means for changing the length of the stroke of the legs for varying the speed of the tractor.

7. A tractor comprising a framework and a plurality of legs having feet thereon for supporting the same, means for reciprocating said legs in alternation and thereby propelling the tractor, and common means for varying the amplitude or length and for reversing direction of reciprocation of said legs.

8. A tractor comprising a frame, a transverse shaft upon the frame, legs pivotally connected to said shafts at points offset therefrom, means for oscillating the shaft to vary the elevation of said pivotal points, and means independent of the shaft to oscillate the legs alternately at different sides of the machine in timed relation to the oscillation of the shaft.

9. A tractor comprising a frame, a transverse shaft upon the frame, bearing-heads rigidly secured to the ends of said shaft, each of said bearing-heads comprising a spindle offset from the axial center of the shaft, legs having feet thereon for supporting the tractor pivotally connected to said offset spindles, means independent of the shaft for oscillating the shaft, and means for oscillating the legs.

10. A tractor comprising a frame, a transverse shaft upon the frame, bearing-heads rigidly secured to the ends of the shaft, each bearing-head comprising a pair of spindles offset in opposite directions from the axis of the shaft, a pair of legs pivoted to each pair of spindles, said legs having extended feet thereon and being relatively positioned on the spindles so that the legs and feet at each side of the machine have clearance past one another, means to oscillate the shaft, and means to oscillate the legs.

11. A tractor comprising a frame, a transverse shaft upon the frame, bearing-heads rigidly secured to the ends of the shaft, each bearing-head comprising a pair of spindles offset in opposite directions from the axis of the shaft, a pair of legs pivoted to each pair of spindles, said legs having extended feet thereon and being relatively positioned on the spindles so that the legs and feet at each side of the machine have clearance past one another, means to oscillate the shaft, and means to oscillate all of said legs simultaneously, a leg at each side of the machine moving in one direction while the other legs at each side of the machine move in the opposite direction.

12. A tractor comprising a frame, a transverse shaft upon the frame, legs pivotally connected to said shaft at points offset therefrom, an arm on said shaft, a rocking member, means connecting said arm with said rocking member, and means to vary at will the point of connection with said rocking member relative to the axis of the rocking member.

13. A tractor comprising a frame, a transverse shaft upon the frame, legs pivotally connected to said shaft at points offset therefrom, an arm on said shaft, a rocking member, a block slidable on said rocking member across the axis thereof and to either side of said axis, a link pivotally connecting said arm and block, and means holding the block in fixed position and for varying at will the position of the block on the sliding member.

14. A tractor comprising a frame, a transverse shaft upon the frame, legs pivotally connected to said shafts at points offset therefrom, an arm on said shaft, a rocking member, a block slidable on said rocking member across the axis thereof and to either side of said axis, a link pivotally connecting said arm and block, a shaft having threaded connection with said block for holding the same in a determined position upon the rocking member, and means for rotating said threaded shaft to vary the position of the block.

15. A tractor comprising a frame, a transverse shaft upon the frame, legs pivotally connected to said shaft at points offset therefrom, an arm on said shaft, a rocking member, a block slidable on said rocking member across the axis thereof and to either side of said axis, a link pivotally connecting said arm and block, a shaft having threaded connection with said block for holding the same in a determined position upon the rocking member, and power means under the control of the operator to rotate said threaded shaft in either direction to vary the position of said block.

16. A tractor comprising a frame and a plurality of legs having feet thereon for supporting the frame, means for reciprocating said legs in alternation and thereby propelling the tractor, means for lifting said legs bodily at the end of the stroke in one direction and for lowering the legs bodily at the end of the stroke in the opposite direction, and means for varying the amplitude through which said legs are lifted and lowered at each stroke 17. A tractor comprising a frame and a plurality of legs having feet thereon for supporting the frame, means for reciprocating said legs in alternation and thereby propelling the tractor, means for lifting said legs bodily at the end of the stroke in one direction and for lowering the legs bodily at the end of the stroke in the opposite direction, and means to reverse the order of lifting and lowering said legs independent of the reciprocating motion.

18. A tractor comprising a framework and a plurality of legs having feet thereon for supporting the tractor, said legs being arranged in pairs at each side of the machine, means for reciprocating the legs of each pair in alternation and thereby propelling the tractor, and independent means for controlling the length of stroke of each pair of legs.

19. A tractor comprising a framework and a plurality of legs having feet thereon for supporting the tractor, said legs being arranged in pairs at each side of the machine, means for reciprocating the legs of each pair in alternation and thereby propelling the tractor, devices for controlling the length of stroke of each pair of legs independently, and power operative means under the control of the operator for actuating either of said independent devices at will.

20. A tractor comprising a frame with a plurality of legs having feet thereon for supporting the frame, means for reciprocating said legs in alternation and thereby propelling the tractor, means for lifting said legs bodily during a portion of the stroke in one direction and for lowering the legs bodily during a corresponding portion of the stroke in the opposite direction, and means for varying the height to which said legs are lifted and from which they are lowered at each stroke.

21. A tractor comprising a framework and a plurality of legs having feet thereon for supporting the tractor, said legs being arranged in pairs at each side of the machine, a crank shaft, a rocking device operated directly thereby, means for reciprocating said legs having connection with said rocking device, and means for varying said point of connection.

22. A tractor comprising a framework and a plurality of legs having feet thereon for supporting the tractor, said legs being arranged in pairs at each side of the machine, a crank shaft, a rocking device operated directly thereby, a second rocking device having a pair of oppositely extended arms, shafts connecting a leg member with each of said arms, and means connecting the two rocking devices for rocking the one last named from the one first named.

23. A tractor comprising a framework and a plurality of legs having feet thereon for supporting the tractor, said legs being arranged in pairs at each side of the machine, a crank shaft, a rocking device operated directly thereby, a second rocking device having a pair of oppositely extended arms, shafts connecting a leg member with each of said arms, a third arm on said last named rocking device, a rod pivotally connected with said arm and with said first named rocking device, and means for varying the point of connection of said rod with the first named rocking device.

24. A tractor comprising a framework and a plurality of legs having feet thereon for supporting the tractor, said legs being arranged in pairs at each side of the machine, a crank shaft, a rocking device operated directly thereby, a second rocking device having a pair of oppositely extended arms, shafts connecting a leg member with each of said arms, a third arm on said last named rocking device, a rod pivotally connected with said arm and with said first named rocking device, and power operative means under the control of the operator for varying the point of connection of said rod with the first named rocking device.

25. A tractor comprising a framework and a plurality of legs having feet thereon for supporting the tractor, said legs being arranged in pairs at each side of the machine, a crank shaft, rocking devices at each side of the machine each having independent connection with the crank shaft, means connected with said rocking devices for reciprocating the legs at opposite sides of the machine, and independent means for adjusting the point of connection of said reciprocating means.

26. A tractor comprising a framework and a plurality of legs having feet thereon for supporting the same, means for reciprocating said legs in alternation and thereby propelling the tractor, said legs being provided with joints permitting the legs to bend in the direction of reciprocation, means for restraining said legs from bending in one direction, and means under the control of the operator for reversing said restraining means.

27. A tractor comprising a framework and a plurality of legs having feet thereon for supporting the same, means for reciprocating said legs in alternation and thereby propelling the tractor, each of said legs comprising an upper bifurcated portion and a lower portion formed with central and side flanges straddling the ends of the upper portion and connected thereto by a pivot bolt, wings on the central flange, and a key movable at will to engage one or the other of said wings and lock the leg from bending in one or the other direction.

28. A tractor comprising a framework and a plurality of legs having feet thereon for supporting the same, means for reciprocating said legs in alternation and thereby propelling the tractor, each of said legs comprising an upper bifurcated portion and a lower portion formed with central and side flanges straddling the ends of the upper portion and connected thereto by a pivot bolt, wings on the central flange, a pivoted key having corresponding wings for engagement with the flange wings, a spring connected to said key member and adapted to hold it so that one or the other of said key wings will engage the corresponding flange wing, and means under the control of the operator for shifting the position of said spring to vary the action thereof.

29. A tractor comprising a framework and a plurality of legs having feet thereon for supporting the same, means for reciprocating said legs in alternation and thereby propelling the tractor, each of said legs comprising an upper bifurcated portion and a lower portion formed with central and side flanges straddling the ends of the upper portion and connected thereto by a pivot bolt, wings on the central flange, a pivoted key having corresponding wings for engagement with the flange wings, a spring connected to said key member and adapted to hold it so that one or the other of said key wings engage the corresponding flange wing, said spring connection having range of movement independent of the key sufficient to permit shifting of the action of the spring, and means under the control of the operator for moving the spring connection in either direction.

30. A tractor comprising a framework and a plurality of legs having feet thereon for supporting the same, means for reciprocating said legs in alternation and thereby propelling the tractor, each of said legs comprising an upper bifurcated portion and a lower portion formed with central and side flanges straddling the ends of the upper portion and connected thereto by a pivot bolt, wings on the central flange, a pivoted key having corresponding wings for engagement with the flange wings, a spring connected to said key member and adapted to hold it so that one or the other of said key wings will engage the corresponding flange wing, and a two-armed device movable by the operator so that one or the other of said arms will engage the spring connection to shift the action of the spring upon the key.

31. A tractor comprising a framework and a plurality of legs having feet thereon for supporting the tractor, said legs being arranged in pairs at each side of the machine, means for reciprocating the legs of each pair in alternation and thereby propelling the tractor, each of said legs being provided with joints permitting the legs to bend in the direction of reciprocation, means for restraining said legs from bending in one direction, and means under the control of the operator for simultaneously reversing the restraining means for both legs of a pair at one side of the machine.

32. A tractor comprising a framework, a plurality of legs connected therewith, each of said legs being provided with a foot, said legs and feet operating to support the tractor, and means connecting the legs and the feet for permitting oscillating movements of the feet on the legs in vertical planes extending longitudinally and transversely of the feet.

33. A tractor comprising a framework, a plurality of legs connected therewith, each of said legs being provided with a foot, said legs and feet operating to support the tractor, and resilient means connecting the legs and the feet for permitting oscillating movements of the feet on the legs in vertical planes extending longitudinally and transversely of the feet.

34. A tractor comprising a framework, a plurality of legs connected therewith, each of said legs being provided with a foot, said legs and feet operating to support the tractor, and means connecting the legs and the feet for permitting oscillating movements of the feet on the legs horizontally with reference to said feet.

35. A tractor comprising a framework, a plurality of legs connected therewith, each of said legs being provided with a foot, said legs and feet operating to support the tractor, means connecting the legs and feet for permitting the feet to oscillate on the legs in a relatively horizontal plane, and means in said connecting means for permitting the feet to oscillate on the legs in vertical planes extending longitudinally and transversely relatively to said feet.

36. A compound tractor consisting of a plurality of traction units, each traction unit comprising a framework and a plurality of legs having feet thereon for supporting the same, means for oscillating the legs of each unit in alternation but corresponding legs of all the units in step, and means connecting the units for permitting relative movements between the units about horizontal and vertical axes.

37. A compound tractor consisting of a plurality of traction units, each traction unit comprising a framework and a plurality of legs having feet thereon for supporting the same, means for oscillating the legs of each unit in alternation but corresponding legs of all the units in step, means connecting the units for permitting relative movements between the units about horizontal and vertical axes, and means under the control of the operator for varying vertically the point of connection of one of said units.

38. A compound tractor consisting of a plurality of traction units, each traction unit comprising a framework and a plurality of legs having feet thereon for supporting the same, means for oscillating the legs of each unit in alternation but corresponding legs of all the units in step, means connecting the units for permitting relative movements between the units about horizontal and vertical axes, an engine on each unit, and transmission means extending through said connecting means for constraining all the engines to operate in unison.

39. A tractor comprising a framework and a plurality of legs having feet thereon for supporting the same, means for reciprocating said legs and thereby propelling the tractor, a cam, a lever operated by said cam, means for rotating said cam, said cam being of such form as to move the free end of said lever in the direction of travel at uniform velocity.

In testimony whereof I affix my signature in presence of two witnesses.

KENNEDY DOUGAN.

Witnesses:
F. A. WHITELEY,
H. A. BOWMAN.